July 1, 1969

J. C. CUMMING 3,453,030

VEHICLE BRAKE SYSTEM

Filed June 22, 1965

INVENTOR
JAMES C. CUMMING

BY Strauch, Nolan, Neale, Nies and Bronaugh
ATTORNEYS

July 1, 1969 J. C. CUMMING 3,453,030
VEHICLE BRAKE SYSTEM
Filed June 22, 1965 Sheet 2 of 2
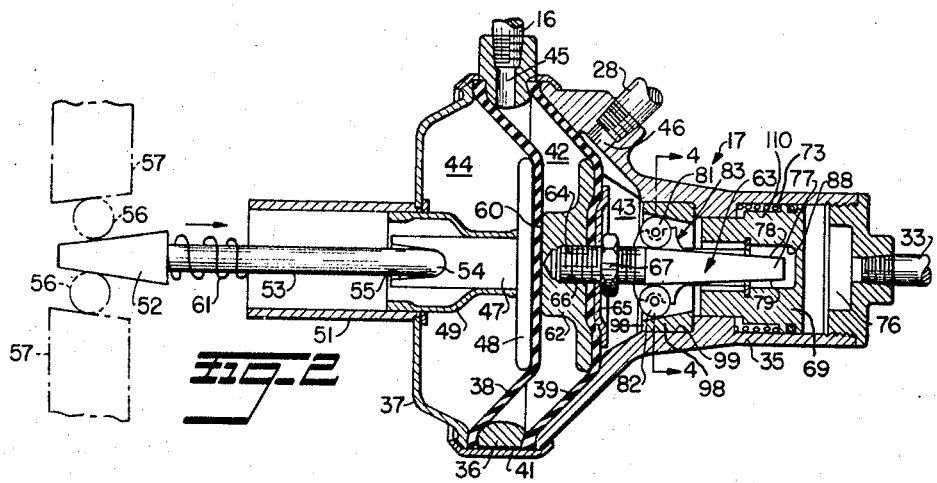
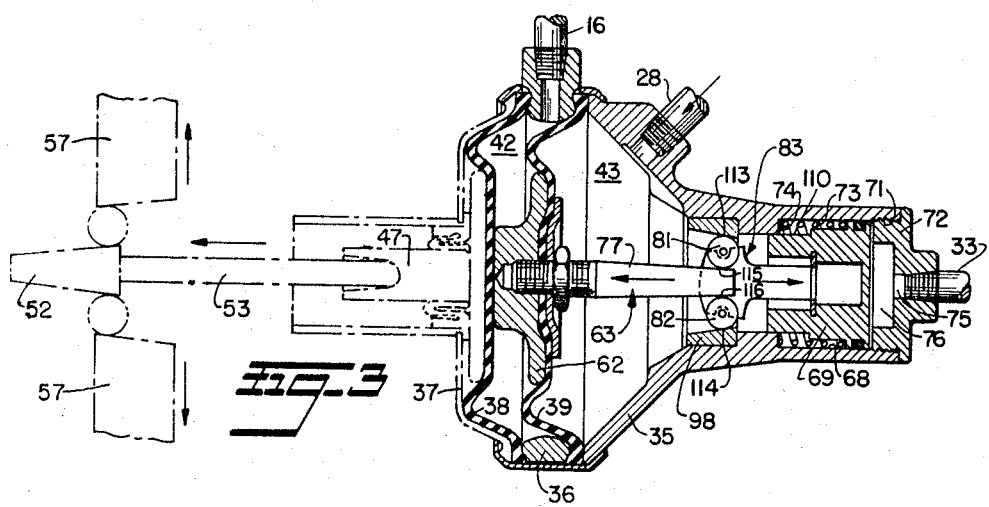
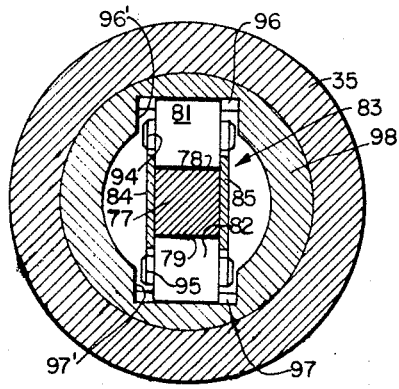
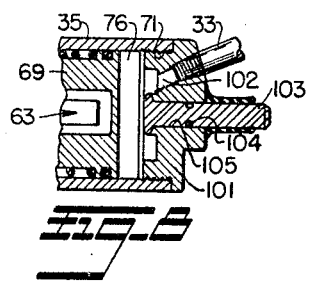
INVENTOR
JAMES C. CUMMING
BY Strauch, Nolan, Neale,
Nies and Bronaugh
ATTORNEYS United States Patent Office 3,453,030
Patented July 1, 1969

3,453,030
VEHICLE BRAKE SYSTEM
James C. Cumming, Pleasant Ridge, Mich., assignor to Rockwell-Standard Corporation, Pittsburgh, Pa., a corporation of Delaware
Filed June 22, 1965, Ser. No. 465,893
Int. Cl. B60t *17/16, 13/00;* B60r *25/08*
U.S. Cl. 303—89                                                12 Claims

ABSTRACT OF THE DISCLOSURE

A vehicle brake system including a multiple chamber brake actuator having a pressure responsive service brake-operating diaphragm connected to the service brake mechanism and another pressure responsive diaphragm adapted to be operated for independent auxiliary or emergency actuation of the service brake mechanism. The brake applying operation of the auxiliary diaphragm is under operator control and after actuation thereof the auxiliary diaphragm and the service brake mechanism are locked in brake applying condition by cooperating structure on the actuator housing and the auxiliary diaphragm. The locking brake mechanism may be quickly released by the operator either by air pressure or manually.

---

This invention relates to brake systems especially adapted for trucks, buses and other heavy roadway vehicles and more particularly to positive mechanical safety locking arrangements for emergency and parking brake actuation.

Vehicular safety considerations have prompted the development of combination service and auxiliary emergency and parking fluid pressure operated brake actuating systems and devices whereby auxiliary brake actuation becomes effective to arrest vehicle movement upon loss of service brake operating air pressure. It has been found desirable that the auxiliary brake actuating means should remain locked once it has been operated to prevent further movement of the arrested vehicle until service fluid pressure can be restored.

In general the earliest practicable brake safety devices providing such actuation and locking means for an auxiliary brake actuator comprised a dual chamber actuator unit, one chamber receiving service air pressure under manual control of the operator for essentially normal service brake actuation, and a second chamber wherein the service brake air pressure supply is connected to maintain a coiled spring energized. This spring is so disposed that reduction of service air pressure below a predetermined limit automatically releases the coiled spring at a rate corresponding to the loss of air pressure for gradually applying the service brakes. Once expanded the spring also functioned to lock the service brake actuating mechanism in applied condition until the spring could again be compressed by manual means. Such a system is disclosed in United States Patent No. 3,136,227 issued June 9, 1964 to William J. Williams.

These spring powered actuators for operating and locking the auxiliary brake actuator embodied certain disadvantages. The size of the spring, and hence of the unit, was necessarily heavy in order to move the brake actuating push rod through the proper distance with adequate force to apply the brakes. Extreme care had to be exercised during assembly or disassembly of the unit to prevent explosion of the energized coiled spring with resultant possible injury to the mechanic or the braking unit. Once automatically actuated, the auxiliary actuator could not be released readily, a disadvantage particularly burdensome in heavy traffic or at some danger point as a blind curve, railway crossing, or tunnel. Additional disadvantages relate to the one-shot nature of this type of combination brake and a lack of operator controlled modulation over the auxiliary actuating means.

These aforementioned disadvantages have contributed to the development of two and three line brake systems which utilize independent air reservoirs as sources for the service operating air pressure and for the auxiliary operating air pressure in combination actuators. These systems have effectively eliminated the energized spring and problems associated with it but have not adequately solved the problem of providing a positive mechanical safety lock of the auxiliary brake actuator whose actuation and release, and modulation within these two extreme limits, can be manually controlled by the operator from the vehicle cab, and the release of which lock is capable of effectuation even while the vehicle is moving so that the auxiliary brake actuator can function as a temporary service brake actuator should the need for such usage arise due to failure of the service brake actuating means.

With the foregoing considerations in mind it is the primary object of the present invention to provide for a fluid actuated emergency and parking brake novel positive mechanical locking means which is capable of engagement, release, and modulation through manually operable controls in the vehicle.

It is a further object of this invention to provide a novel emergency and parking brake locking means which can be released other than when vehicle motion is arrested.

Still a further object of the invention is to provide a brake locking means which is capable of automatic engagement, release, and re-use an indefinite number of times, this capability being independent of vehicle movement.

Another object resides in providing a brake locking means which allows use of the emergency and parking brake actuating means to serve as a temporary service brake actuating means by providing more than a one-time capability and which does not prevent modulation of the emergency and parking brake.

Another object resides in providing a fluid actuated mechanical brake locking means which once locked is unaffected by a subsequent loss of the actuating fluid pressure.

Another object of the invention is to provide at a wheel of a roadway vehicle a combination service and auxiliary actuator whereby the service brakes may be independently applied through either service or auxiliary operation and wherein the service brakes are automatically locked in applied condition and may be readily released by the operator.

A further object of the invention is to provide a novel multiple chamber actuator having a pressure responsive service brake operating element operatively connected to a service brake mechanism and another pressure responsive element adapted to be operated for independent auxiliary actuation of said service brake mechanism, wherein brake applying operation of said other element is under operator control and the service brake mechanism is locked in applied condition after actuation by said other element. Pursuant to this object the invention also contemplates a quick release of the locked brake mechanism, either by air pressure or manually.

Further objects of the invention will appear in connection with the appended claims and the annexed drawings wherein:

FIGURE 2 is a section through an actuator according to a preferred embodiment of the invention and shows diagrammatically its connection to one form of brake operator, the parts being here shown in brake disengaged position;

FIGURE 3 is a section similar to FIGURE 2 showing the parts in brake applied position under control of the auxiliary operator;

FIGURE 4 is a section on line 4—4 of FIGURE 2 showing the wedge and ramp association;

FIGURE 8 is a fragmentary section of an embodiment similar to FIGURES 1 and 2 but including a manual release for the auxiliary operator.

Figure 1:
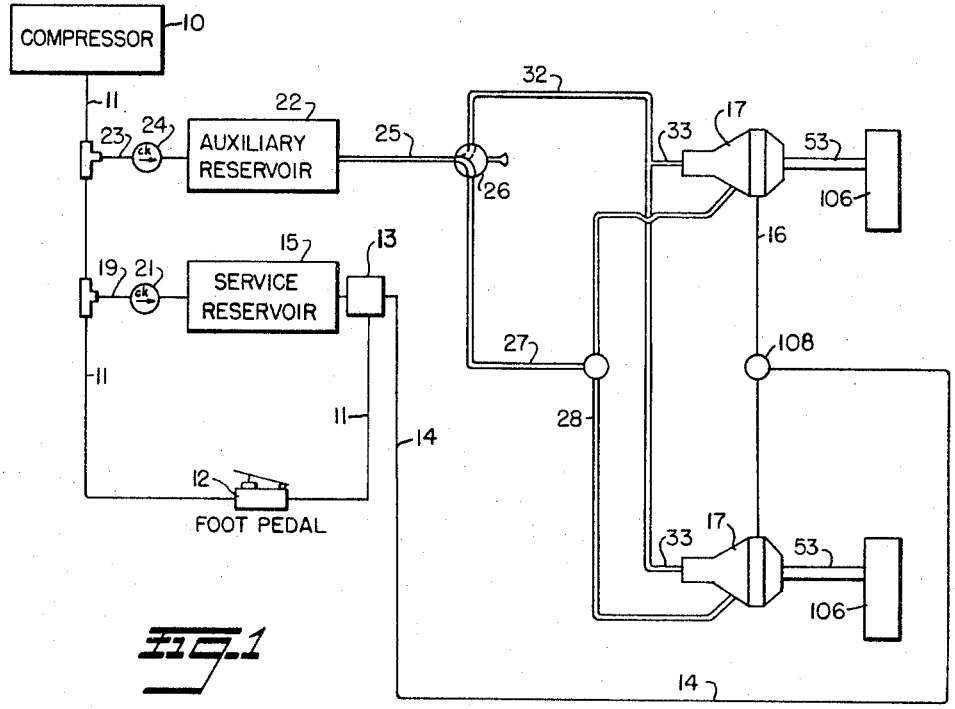
FIGURE 1 is a diagrammatic view of a vehicle service and auxiliary brake operating system incorporating the invention.

Referring to FIGURE 1, the system which is mounted on a roadway vehicle having ground engaging wheels comprises a compressor 10 driven by the vehicle engine to supply air under pressure through a conduit 11 connected to a foot pedal controlled valve 12 and a relay valve 13 disposed in service conduit 14 that extends from a service reservoir 15 to a cross conduit 16 extending between the service air chambers of the brake actuator units 17 mounted at the opposite ends of a transverse axle (not shown). Actuators 17 will presently be described.

Service reservoir 15 is maintained to serve as a source of air under pressure, being connected to conduit 11 by a conduit 19 containing a check valve 21 that prevents escape of pressure when the compressor is not being driven.

The system also includes an auxiliary reservoir 22 supplied with air under pressure from the compressor through conduit 23 and check valve 24. The outlet of reservoir 22 is connected by conduit 25 to a selector valve 26 which is normally closed. Valve 26 may be shifted from closed position to the illustrated full line position where it is positioned to provide communication between conduit 25 and an auxiliary air conduit 27 connected to cross conduit 28 extending between the auxiliary air chambers of actuators 17. As will appear the full and dotted line positions of valve 26 indicate separate operative auxiliary control conditions to be described.

A release air conduit 32, which is connected to the auxiliary air pressure conduit 25 when selector valve 26 is turned to the dotted line position shown in FIGURE 1, is connected by spur conduits 33 to the release air chambers of actuator 17.

The system shown in FIGURE 1 illustrates only two actuators 17, one for each of the wheel brakes at the ends of an axle (not shown) but it will be understood that the invention may be applied to any number of axles and wheel brakes by suitably connecting actuators 17 therefor to the respective service, auxiliary and release air conduits.

Referring now to FIGURES 2–4, each actuator 17 comprises a main housing member 35, an annular intermediate housing member 36 and a housing end member 37. A service diaphragm 38 of the usual flexible type has its periphery clamped fluid tight between the housing end and intermediate members. A flexible auxiliary diaphragm 39 has its periphery clamped fluid tight between the intermediate and main housing members. Preferably the three housing members and the diaphragm peripheries are clenched in tight assembly by a single sheet metal clamp ring 41.

Diaphragms 38 and 39 define between them a service air chamber 42, and an auxiliary air chamber 43 is defined within the main housing member at the right of diaphragm 39. The housing end chamber 44 to the left of diaphragm 38 is normally open to atmosphere.

The service air conduit 16 is connected through opening 45 in the housing member 36 into the service air chamber 42, and the auxiliary air conduit 28 is connected through opening 46 in the main housing member 35 into the auxiliary air chamber 43.

Housing end chamber 44 contains a rod 47 formed at its inner end with an abutment plate 48 engaging the service diaphragm 38. Rod 47 is supported in an axially flexible boot 49 secured at its outer end to a housing mounting tube 51 in the apertured housing end member 37. An actuator wedge 52 is carried by a stem 53 having its rounded end 54 socketed in a depression 55 in the rod end. Wedge 52, when displaced to the left as shown in FIGURE 3, acts through rollers 56 to oppositely displace brake shoe connected plungers 57. This wedge, roller and plunger arrangement is preferably that shown in United States Patent No. 3,037,584 to which reference is made for further detail.

A spring 61 diagrammatically shown in FIGURE 2 represents biasing spring means urging the service diaphragm to its brake released position shown in FIGURE 2, and may comprise the usual brake shoe return springs alone or an auxiliary light spring in the actuator 17.

A spacer member 62 disposed in service chamber 42 has its left end 60 in separable abutment with the inner side of service diaphragm 38. Spacer member 62 is centrally secured to auxiliary diaphragm 39. A wedge rod 63 has a threaded end 64 extending through a clamp plate 65 and the apertured center of diaphragm 39 for mounting in a threaded recess 66 in spacer 62. A nut 67 is drawn tight against clamp plate 65 to secure spacer 62, diaphragm 39, plate 65 and wedge rod 63 in assembly.

Beyond the auxiliary air chamber main housing member 35 is reduced to a neck section containing a cylinder 68 in which is slidably mounted a stepped diameter piston 69. The open end of cylinder 68 is threaded at 71 to receive a colsure member 72 which serves as an end abutment for piston 69 as the piston is biased to the right by a compression spring 73 seated on internal shoulder 74 of cylinder 68. The release air conduit 33 is connected through an aperture 75 in closure 72 into a release air chamber 76 formed between closure 72 and the end of piston 69.

The wedge portion 77 of rod 63 has opposed inclined flat sides 78 and 79 that have rolling contact with opposed rollers 81 and 82 mounted in a cage 83 secured to piston 69.

Figure 6:
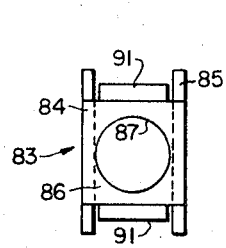
FIGURES 5, 6 and 7 are respectively plan, rear end and side views showing the cage for floating mount of the rollers in the locking wedge arrangement.
Figure 5:
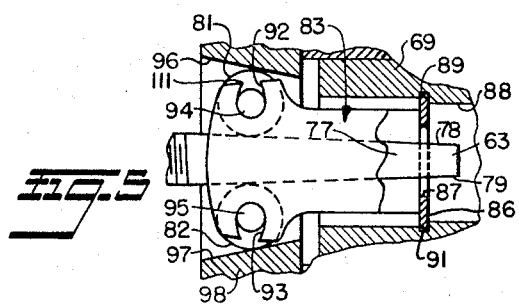
Figure 7:
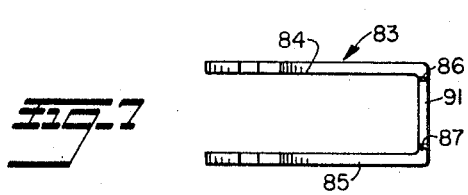

The cage 83 as shown in FIGURES 5–7 is preferably an integral sheet metal element that is bent into U-shape with parallel side arms 84 and 85 connected at one end by a bridge 86 having an aperture 87.

Piston 69 is formed with a deep recess 88 of sufficient axial extent to accommodate wedge member 63 in its extreme right hand position shown in FIGURE 1. The side wall of recess 88 is slotted at 89 to receive projections 91 on the cage bridge to anchor the cage 83 to piston 69. Thus cage 83 also extends within recess to provide an axially compact assembly of the piston, wedge member 63 and cage 83, with wedge member 63 passing freely through cage bridge aperture 87.

Apart from its modified bridge structure the cage 83 is otherwise of about the same construction as the roller carrier for the brake actuating wedge disclosed in said Patent No. 3,037,584. The arms 84 and 85 are formed near the open end of the cage with oppositely open transverse slots 92 and 93 loosely rotatably and slidably receiving the arbors 94 and 95 of cylindrical rollers 81 and 82 respectively which are disposed between the wedge surfaces 78 and 79 and coacting longitudinally extending inclined ramp surfaces 96 and 97 on an axially fixed ramp member 98 that is secured within a shouldered internal section 99 of housing member 35. Ramp surfaces 96 and 97 are formed in the bottoms of diametrically opposed longitudinal solts 96' and 97' in the ramp. Rollers 81 and 82 are mounted for rotation on the cage 83 and are free to float laterally in slots 92 and 93 during wedge displacement as will appear.

The axes of rollers 81 and 82 lie in a plane that is perpendicular to the axis of longitudinal movement of wedge member 63. Wedge surfaces 78 and 79 are oppositely inclined at the same angle to the longitudinal axis of wedge member 63, and wedge 63 is prevented from turning in the assembly. Preferably this wedge surface forms with the inclined ramp surface an angle within the range of about 8–13 degrees, the selected angle being dependent upon the friction between these surfaces and the rollers and the relative flexibility of the elements comprising the components. Ramp surfaces 96 and 97 are always coextensive with portions of the inclined wedge surface, and ramp surfaces 96 and 97 are oppositely inclined in the same direction as the wedge surfaces. The ramp surfaces 96 and 97 are inclined at the same angle, and this angle is slightly steeper than the wedge surface angle with respect to the longitudinal axis of wedge member 63, so that in all longitudinal positions of wedge member 63 relative to piston 69 the diameters of rollers 81 and 82 will be slightly greater than the distances between surfaces 78 and 96, and surfaces 79 and 97, respectively. This means that wedge member 63 may be longitudinally displaced relative to piston 69 to the left in FIGURES 1, 2, and 5 but is wedge locked against movement in the opposite direction.

During longitudinal displacement of the wedge member 63 to the left in FIGURE 1 rollers 81 and 82 maintain rolling contact between the wedge and ramp surfaces, floating transversely in the slots to compensate for the changing distances between the wedge and ramp surfaces.

Referring to FIGURE 8 the structure is the same as FIGURE 2 except that a different closure member 101 is threaded onto the housing at 71. Here the release air pressure conduit 33 is connected to enter chamber 76 through an opening 102, and the closure centrally slidably supports a plunger 103 having an O-ring seal 104 with the closure bore 105. This modification thus provides, in addition to the operator controlled air release, a manually operable release that may be effected by striking the projecting plunger and a hammer blow as will appear.

*Operation*

The apparatus is initially assembled with the parts, particularly diaphragm 39, wedge rod 63 and piston 69 in the relationship shown in FIGURE 2. In assembly the ramp 98 is installed by press fit within shoulder 99. Spring 73 is placed around the middle diameter portion 110 of piston 69, and the bridge portion of cage 83 is inserted into the piston recess 88 to snap projections 91 into slots 89. The rollers 81 and 82 are held upon the cage because the outer ends of slots 92 and 93 are pinched in as at 111 to an opening of less than the diameter of the roller arbors.

Now the subassembly of piston 69, spring 73 and the cage 83 with rollers is introduced through the smaller open left end of housing member 35, the ramp slots 96' and 97' being deep enough to permit the rollers to displace toward each other in the cage slots sufficiently to pass through the smaller open end of ramp 98. Cap 72 is now attached to close the small end of housing member 35, and pressure is introduced through opening 75, either by a rod or fluid pressure, to displace piston 69 to the left in FIGURE 2 until the rollers are located at the widest portion of the ramp as shown in FIGURE 2 with spring 73 compressed between the housing and the piston. With this pressure maintained the sub-assembly comprising wedge rod 63 with its threaded end secured to diaphragm 39, spacer 62 and plate 65 is introduced into housing member 35, the smaller end of wedge 77 being thrust between rollers 81 and 82 and pushed to the right in FIGURE 1 until there is snug rolling contact between the rollers and the inclined ramp and wedge surfaces.

Now the pressure is removed from the right end of piston 69. Spring 73 expands and tends to displace piston 69 to the right in FIGURE 2 but due to the interference fit of the rollers with the inclined wedge and ramp surfaces the spring action forces these parts into locking relationship to prevent relative movement between wedge member 63 and piston 69 and to hold these parts in the relationship of FIGURE 2.

Diaphragms 38 and 39 are then attached to the housing parts, the clenching ring 41 secured in place, and the assembly completed. Any tendency of diaphragm 39 and wedge member 63 in the assembly to move to the left in FIGURE 2 is resisted by the spring biased wedge lock of the wedge with the ramp.

During normal conditions the vehicle brakes are operated like any other pneumatic brakes, the operator treading on pedal 12 to pass air under pressure through service conduit 14 and branch conduit 16 to each service actuator chamber 42. When the operator takes his foot off the pedal to release the brakes air from the actuators 17 is quickly exhausted through release valve 108.

FIGURE 2 shows the parts in the brake released condition wherein there is no air pressure in any of chambers 42, 43 or 76 and the brake shoe return or other biasing spring 61 urges both diaphragms to the right in FIGURE 2.

When air under pressure enters service chamber 42, diaphragm 38 is displaced to the left away from spacer 62 in FIGURE 2 and acts through wedge 52 to oppositely displace plungers 57 to apply the service brake shoes to the wheel drums shown diagrammatically at 106 in FIGURE 1. During this time diaphragm 39 remains substantially in its right hand position of FIGURE 2, being urged even further in that direction by the air pressure in service chamber 42. Piston 69 therefore remains substantially stationary.

During this normal service air actuation the auxiliary system remains inoperative, valve 26 being closed.

Should the service air system fail as by a break in service conduit 14, the operator will note this by failure of the brakes to respond to his pedal operation, or possibly by a suitable visual signal before him. He may now selectively apply the service brakes by turning valve 26 to the full line position of FIGURE 1. This brings into effect the independent auxiliary air system from reservoir 22 which supplies air under pressure through auxiliary air conduit 27 and branch conduit 28 into auxiliary air chamber 43 of each actuator 17, and results in the parts being displaced to the relationship shown in FIGURE 3.

When air under pressure occupies chamber 43 diaphragm 39 is displaced to the left in FIGURE 3 so that spacer 62 solidly abuts diaphragm 38 and shifts diaphragm 38 and wedge 52 in the brake applying direction just as in service air operation. Wedge 77 is carried with diaphrgam 39 and moves to the left relative to cage 83.

During this auxiliary operation air under pressure in chamber 43 also acts upon piston 69 to move it to the right in FIGURE 3 toward but never into contact with closure 72. This is aided and smoothed by the expansion of spring 73. The cage and roller assembly attached to piston 69 by the bridge of the cage moves to the right with the piston.

As the wedge 77 and the cage 83 are oppositely displaced, the rollers 81 and 82 roll along the ramp and wedge surfaces so that the unlocking action is accomplished with minimal frictional resistance and without binding. The movement of both the wedge and the cage and roller assembly, though both dependent upon air pressure within auxiliary chamber 43, are relatively independent of each other, that is, the wedge movement is dependent upon the displacement of diaphragm 39 to the left whereas the cage and roller assembly movement is dependent upon the piston displacement to the right.

The rollers 81 and 82 are always in contact with the oppositely inclined wedge surfaces 86 and 88 and the associated ramp surfaces 96 and 97; and during all relative movements of the wedge and cage and roller assemblies in one direction the rollers remain in rolling sliding contact with these surfaces. Spring 73 as will be subsequently explained, functions to assure continual roller contact with these surfaces in such readiness as to prevent return relative movement between the wedge and piston at any time.

In FIGURE 3 which shows the locking means engaged when the diaphragm and piston have been fully displaced within the limits of the auxiliary chamber, there exists an actual interference fit of the rollers 81 and 82.

(1) Against ramp surfaces 96 and 97 at points 113 and 114; and (2) Against wedge surfaces 78 and 79 at points 115 and 116.

This interference fit is not to be confused with providing a locking means through the use of frictional resistance. The outside diameter of the rollers 81 and 82 here are slightly larger than the spatial dimension between the relatively sloping wedge and ramp surfaces immediately to the right of the rollers at any given longitudinal position of engagement. This will be true regardless of where the rollers are positioned along the ramp. Thus it is possible to affect an auxiliary brake lock at any point along the ramp guide slots, a feature which, as will be subsequently explained, makes possible operator controlled modulation of the brake. In practice it is anticipated that such factors as age of the diaphragm, wear of the brake lining, internal temperature of the unit, routine wear and tear of the unit components, capability of operator to modulate air pressure into the auxiliary chamber, among others, will preclude maximum, or the same amount, of piston or diaphragm 39 displacement each time the auxiliary brake is actuated. These latter considerations only serve to emphasize the importance and desirability of providing for the lock to occur at any point along the ramp guide slots.

The spring 73 plays a very important role in the locking means. When the auxiliary brake is not actuated (FIGURE 2), spring 73 remains compressed as assembled. In this position it exerts a reactive force to the right of approximately five pounds upon the piston 69. However, movement of the interconnected piston and cage assembly to the right due to this spring reactive force is prevented by the existence of an interference fit of the roller between the wedge surfaces and ramp guide slot surfaces. Though both the adjacent wedge and ramp surfaces slope in the same direction at each roller, the rate of slope between them varies such that the spatial dimension immediately to the right of each roller is less than the roller's outside diameter, thus creating the interference fit in that direction. The expending spring force at 73 assures that the rollers will always be in contact with the wedge and ramp surfaces, and positively serves to prevent movement of the roller and cage assembly to the left.

When the auxiliary brake system is actuated (FIGURE 3), fluid pressure acting upon diaphragm 38 causes the wedge 77 to move to the left, breaking the interference fit. This same fluid pressure acting in the opposite direction upon piston 69 in conjunction with the expanding spring force serves to move piston 69 to the right. The amount of displacement will be dependent upon the amount of air pressure introduced into the chamber 43 and the factors previously mentioned. Spring 73 continues to act, but with diminishing force related to its degree of expansion, to maintain this cage movement to the right and to keep the rollers in contact with both the wedge and ramp surfaces. As in the prior instance an interference fit to the right will be created as soon as relative separational movement between the wedge and piston ceases, because of the varying slope characteristics of the wedge and ramp surfaces. Thus it is possible to lock the auxiliary actuating means at any point along the ramp surfaces by merely providing the operator with a suitable control valve at 26 or other means of modulating the air pressure into the auxiliary chamber.

Should fluid pressure escape from chamber 43 with the brake locked as shown in FIGURE 3, the established interference fit at the lock prevents movement of wedge 77 to the right, and movement of the roller and cage assembly to the left is at the same time resisted and prevented by the expanded spring 73. Thus once engaged the locking means at the ramp becomes independent of the pressure setting within the auxiliary chamber 43 or its subsequent loss. It can only be broken by the introduction of additional fluid under pressure to further move the diaphragm 39 and wedge 77 to the left and to further displace the caged rollers to the right along the ramp should their initial displacement be less than maximum to increase the braking force, or by the introduction of air under pressure through the release port 75 to intentionally release the braking force.

To release the brake locking means once so engaged requires the introduction of fluid under pressure through the release port 75 simultaneously with venting the auxiliary chamber 43 through port 46. The fluid entering through port 75 acts upon piston 69 to move the piston to the left compressing spring 73. Simultaneous with the piston and cage and roller assembly movement, diaphragm 39 with the attached wedge 77 flexes back toward its normal FIGURE 2 position as the auxiliary chamber is vented, and the assembly once again assumes the "unlocked" position shown in FIGURE 2. In this position with the spring 73 once again compressed, it tends to move the piston and cage and roller assembly to the right once again creating the interference fit to the right freezing the assembly in this setting until the auxiliary brake is again actuated.

The invention is equally adaptable to two or three line fluid systems by merely providing proper valving to control and regulate the entry of fluid into the various housing member chambers.

What is claimed and desired to be secured by Letters Patent is:

1. A combined service and auxiliary actuator assembly for a vehicle brake comprising a service fluid pressure system adapted to be connected for normal operation of said brake, a normally inoperative auxiliary fluid pressure system adapted to be connected for auxiliary operation of said brake, means for maintaining said auxiliary system inoperable while said service system is operated, an actuator housing, two spaced fluid pressure responsive members mounted within said housing and exposed to separate fluid pressure chambers within said housing, one of said chambers being operably connected to said service fluid pressure system and the other chamber being operably and independently connected to said auxiliary fluid pressure system, a brake mechanism actuator member operably connected to the one fluid pressure responsive member exposed to service fluid pressure, said fluid pressure responsive members being displaceable in the same direction for moving said brake mechanism actuator member in brake applying direction, cooperating means mounted on said housing and said other fluid pressure responsive member automatically effective only when said brake is operated by said auxiliary system for locking said other member against return movement in different positions of displacement in said brake applying direction and thereby locking said brake in applied condition, and means accessible to the vehicle operator for selectively releasing said locking means.

2. In a vehicle brake system characterized by an actuator assembly including a housing having separate internal chambers connected by independent conduits respectively to a service air pressure reservoir and an auxiliary air pressure reservoir, first operator controlled valve means in the conduit to the service air reservoir for normal actuation of a vehicle brake by service air pressure, a second operator controlled valve means in the conduit to the auxiliary air pressure reservoir, said second valve means being closed during said normal service air pressure actuation, fluid pressure responsive members associated with said chambers and a vehicle brake actuator operatively connected to be displaced in brake applying direction by either of said members, means for operating said second valve to connect said auxiliary air reservoir to said auxiliary air chamber to displace said auxiliary pressure responsive member in brake applying direction, and co-operating means mounted on said housing and said auxiliary pressure responisve member effective only when said second valve means is operated to displace said auxiliary pressure responsive member in said brake applying direction for locking said auxiliary fluid pressure responsive member in said brake applying direction against movement in the opposite direction.

3. In the system defined in claim 2, a release chamber in said housing and a third pressure responsive member in said release chamber operably connected to said arresting means, and conduit means connected between said second operator controlled valve and said auxiliary and release chambers whereby said second valve in one position admits air under pressure into said auxiliary chamber and in another position connects said auxiliary air pressure chamber to exhaust and said auxiliary air reservoir to said release chamber.

4. An actuator assembly for a vehicle brake comprising a housing, two spaced fluid pressure responsive members within said housing exposed to separate fluid pressure chambers within said housing, one of said chambers being adapted to be connected to a service fluid pressure line, and the other chamber being adapted to be connected to an independent auxiliary fluid pressure line, a brake mechanism actuator member operably directly connected to the one member exposed to service fluid pressure, said members being displaceable in the same direction for moving said actuator member in brake applying direction, means directly operatively connected to said other member for locking said other member against return movement in different positions of displacement in said brake applying direction, and means accessible to the vehicle operator for selectively releasing said locking means.

5. In the actuator assembly defined in claim 4, said operator controlled releasing means comprising fluid pressure means.

6. In the actuator assembly defined in claim 5, said operator controlled releasing means comprising supplemental manual means.

7. An actuator assembly for a vehicle brake comprising a housing, two spaced flexible diaphragms within said housing defining separate fluid pressure chambers, one of said chambers being disposed between the diaphragms and being adapted to be connected to a service fluid pressure line, and the other chamber being disposed between one of said diaphragms and the housing and being adapted to be connected to an independent auxiliary fluid pressure line, a brake mechanism actuator member directly operably connected to the other of said diaphragms at the side opposite said service fluid pressure chamber, said diaphragms being displaceable in the same direction for moving said actuator member in brake applying direction, means directly operatively connected to said one diaphragm for locking said one diaphragm against return movement in different positions of displacement in said brake applying direction, and means accessible to the vehicle operator for selectively releasing said locking means.

8. An actuator assembly for a vehicle brake comprising a housing, two spaced fluid pressure responsive members within said housing defining separate fluid pressure chambers, one of said chambers being disposed between said members and being adapted to be connected to a service fluid pressure line, and the other chamber being disposed between one of said members and the housing and being adapted to be connected to an auxiliary fluid pressure line, a brake mechanism actuator device operably directly connected to the other of said members at the side opposite said service fluid pressure chamber, said members being displaceable in the same direction for moving said actuator device in brake applying direction, and means for locking said one member against return movement in different positions of displacement in said brake applying direction comprising cooperating wedge surface and roller means directly operatively interposed between said one member and the interior of said housing.

9. An actuator assembly for a vehicle brake comprising a housing internally separated into service and auxiliary fluid pressure chambers, flexible diaphragms mounted in tandem to define said chambers, a brake mechanism actuator member operably connected for selective displacement in brake applying direction by either of said diaphragms, operator controlled means for selectively admitting fluid under pressure from independent sources into the respective chambers, and unidirectional locking wedge and roller means effective in substantially any position of displacement of the auxiliary diaphragm in the brake applying direction for automatically arresting it against movement in the opposite direction, said locking wedge and roller means comprising a stem mounted on said auxiliary diaphragm and having a pair of opposed longitudinally inclined surfaces, longitudinally coextensive similarly inclined surfaces on said housing, and wedging rollers interposed between and mounted for longitudinal displacement relative to said surfaces.

10. In an actuator assembly for a vehicle brake, a housing containing a chamber, a fluid pressure responsive member movable within said chamber, means for controllably admitting fluid under pressure into said chamber for displacing said member in brake applying direction, a locking wedge directly carried by said member, a piston longitudinally slidably mounted in said housing, a carrier on said piston mounting roller means interposed between said wedge and cooperating locking surface means on said housing, said roller means permitting said displacement of said member in the brake applying direction, and spring means biasing said piston to urge said roller means into locking position between said wedge and housing surface means for preventing movement of said member in the opposite direction.

11. An actuator assembly for a vehicle brake comprising a housing internally separated into service and auxiliary fluid pressure chambers, a fluid pressure responsive member for each chamber, a brake mechanism actuator member operably connected for selective displacement in brake applying direction by either of said fluid pressure responsive members, operator controlled means for selectively admitting fluid under pressure from independent sources into the respective chambers, unidirectional locking wedge and roller means effective in substantially any position of displacement of the auxiliary fluid pressure responsive member in the brake applying direction for automatically arresting it against movement in the opposite direction, said locking means comprising a stem mounted on said auxiliary fluid pressure responsive member and having longitudinally inclined wedge surfaces, a longitudinally coextensive similarly inclined surfaces on said housing, and rollers interposed between adjacent surfaces, a carrier on which said rollers are mounted for transverse floating displacement, a carrier mounting member shiftably disposed in said housing, and spring means biasing said carrier mounting member to urge said rollers into locking relation with said surfaces.

12. In the actuator assembly defined in claim 11, said carrier mounting member being a fluid pressure responsive element disposed in a release chamber in said housing, and means under control of the operator for introducing fluid under pressure into said release chamber to shift said element against the opposition of said spring means.

References Cited

UNITED STATES PATENTS

| | | | |
|---|---|---|---|
| 3,223,458 | 12/1965 | Valentine | 303—6 |
| 2,305,302 | 12/1942 | Mazur | 92—28 X |
| 2,759,569 | 8/1956 | Keehn | 303—89 X |
| 3,011,832 | 12/1961 | Euga | 303—6 X |
| 3,173,726 | 3/1965 | Valentine et al. | 303—9 |
| 3,151,525 | 10/1964 | Dobrikin et al. | 92—24 |

MILTON BUCHLER, *Primary Examiner.*

JOHN J. McLAUGHLIN, Jr., *Assistant Examiner.*

U.S. Cl. X.R.

91—45; 92—24; 303—6, 9, 13, 71

UNITED STATES PATENT OFFICE
CERTIFICATE OF CORRECTION

Patent No. 3,453,030           Dated July 1, 1969

Inventor(s) J. C. Cumming

It is certified that error appears in the above-identified patent and that said Letters Patent are hereby corrected as shown below:

Column 1, line 4, change "Rockwell-Standard Corporation" to -- Rockwell Standard Company --.

Column 4, line 39, change "colsure" to -- closure --.

SIGNED AND SEALED
APR 28 1970

(SEAL)
Attest:

Edward M. Fletcher, Jr.
Attesting Officer

WILLIAM E. SCHUYLER, JR.
Commissioner of Patents